(No Model.)
W. H. CARTER.
HAY KNIFE.
No. 316,523. Patented Apr. 28, 1885.
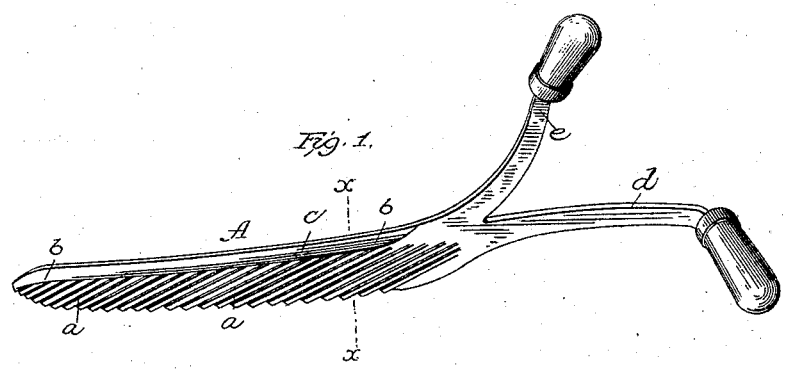
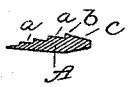
Attest:
Walter Donaldson
F. L. Middleton
Inventor
Wallace H. Carter
by Joyce & Spear
Attys.

UNITED STATES PATENT OFFICE.

WALLACE H. CARTER, OF HALLOWELL, MAINE.

HAY-KNIFE.

SPECIFICATION forming part of Letters Patent No. 316,523, dated April 28, 1885.

Application filed November 29, 1884. (No model.)

*To all whom it may concern:*

Be it known that I, WALLACE H. CARTER, of Hallowell, in the county of Kennebec and State of Maine, have invented a new and useful Improvement in Hay-Knives; and I do hereby declare that the following is a full, clear, and exact description of the same.

My invention relates to hay-knives, and is an improvement upon the knife shown in Letters Patent granted to me on the 29th day of April, 1884. The leading feature of that invention was the form of grooving across the blade from side to side, in connection with the serrated cutting-edge. In order to hold the blade to its work, the grooves were made across the entire surface of the blade, the surface being the same from edge to back, so that the ends of the hay served to guide the knife in its movement, and no smooth surface was left to cause the knife to slip, the principle of the invention requiring the grooving substantially across the whole surface; but in the manufacture of the blade, where plane surfaces are formed upon the sides, this principle requires grooving to an extent not necessary for the formation of the serrated teeth in the gradual wearing and grinding of the blade by long and continual use. In order to avoid, therefore, the necessity of grooving all the way across, and at the same time to retain the guides or guiding across practically from edge to back, I combine the groove with a thinner portion, which is preferably beveled, whereby the grooved surface is made narrower but practically continuous from edge to back; and in this the first part of my invention consists.

In the accompanying drawings, Figure 1 shows a perspective view of the cutter, and Fig. 2 a cross-section on line $x$ $x$ of Fig. 1.

The groovings $a$ $a$ of the blade A are preferably the same as those shown in my aforesaid patent; but they may, with equally good effect, be inclined on both sides; but, instead of running obliquely across the entire surface from edge to back, they extend to a line, $b$ $b$. Less than the entire distance to this line is the margin of the bevel $c$, Fig. 2, which extends down to the back. This bevel slopes back sufficiently from the grooved surface so as not to furnish a bearing-surface for the ends of the straws in the mass of hay from which the cut is made. This renders it unnecessary to groove the whole surface, and at the same time leaves a total bearing-surface which passes in contact with the ends of the straw grooved across its whole width, and gives an effect precisely the same as if the whole width of the blade were grooved.

The blade by this construction is left thicker in or near the middle, which is the best shape for strength. This construction also gives a convex shape to the grooved surface, which adds greatly to the guiding effect of the grooves.

In this class of cutters, where the pressure goes upon the handle, rigid shanks are required to sustain the handles, and I form these shanks in positive curves and integral with the blade. The shank $d$ of the right-hand handle is curved to the right and the other shank, $e$, is curved to the left. They are also curved sidewise sufficiently to clear the hay. The tangs for the handles are bent nearly at right angles, but a little spread to right and left. This brings the handle in convenient position for the two hands, and gives a strong and rigid connection between the handles and blade.

I claim as my invention—

In a hay-knife, a blade having a diagonal-grooved face and a back portion of less thickness than the grooved portion, the grooves forming a serrated edge and extending to the margin of the back portion, substantially as described.

In testimony whereof I have signed my name to this specification in the presence of two subscribing witnesses.

WALLACE H. CARTER.

Witnesses:
JAMES H. MOSHER,
WILLARD A. BODWELL.